United States Patent [19]
Hida et al.

[11] Patent Number: 5,524,033
[45] Date of Patent: Jun. 4, 1996

[54] NUCLEAR FUEL CONTAINING GADOLINIUM

[75] Inventors: Kazuki Hida, Tokyo; Tadashi Ikehara; Koichi Nittoh, both of Kanagawa, all of Japan

[73] Assignee: Kabushiki Kaisha Toshiba, Kawasaki, Japan

[21] Appl. No.: 245,667

[22] Filed: May 18, 1994

[30] Foreign Application Priority Data

May 18, 1993 [JP] Japan ................................ 5-116214

[51] Int. Cl.$^6$ .................................................. G21C 3/00
[52] U.S. Cl. .......................... 376/419; 376/435; 376/428; 376/350; 376/351
[58] Field of Search .................................. 376/419, 435, 376/428, 431, 350, 351; 976/DIG. 64

[56] References Cited

U.S. PATENT DOCUMENTS

| | | | |
|---|---|---|---|
| 4,280,874 | 7/1981 | Kawai et al. | |
| 4,587,090 | 5/1986 | Mochida et al. | 376/428 |
| 4,629,599 | 12/1986 | Crowther et al. | 376/212 |
| 4,652,427 | 3/1987 | Uchikawa et al. | 376/447 |
| 4,668,468 | 5/1987 | Santucci | 376/419 |
| 4,683,113 | 7/1987 | Mochida et al. | |
| 5,207,979 | 5/1993 | Koyama et al. | 376/419 |
| 5,337,337 | 8/1994 | Aoyama et al. | 376/435 |
| 5,367,547 | 11/1994 | Hida et al. | 376/435 |
| 5,416,813 | 5/1995 | Hiraiwa et al. | 376/419 |

FOREIGN PATENT DOCUMENTS

| | | |
|---|---|---|
| 0532858 | 3/1993 | European Pat. Off. |
| 3308956 | 9/1983 | Germany. |
| 3308619 | 9/1983 | Germany. |
| 55-132991 | 10/1980 | Japan. |
| 58-140673 | 8/1983 | Japan. |

OTHER PUBLICATIONS

DATABASE WPI, Derwent Publications Ltd., AN 91-220337, JP-A-042437, Jun. 27, 1991.

Transactions of the American Nuclear Society, vol. 50, Nov. 1985, pp. 102–103, C. M. Hove, et al., "Improvement Of Gadolinia Fuel Cycle Economics By Isotopic Enrichment Of 157Gd".

*Primary Examiner*—Donald P. Walsh
*Assistant Examiner*—Meena Chelliah
*Attorney, Agent, or Firm*—Oblon, Spivak, McClelland, Maier & Neustadt

[57] ABSTRACT

Gadolinium is provided which is adapted for nuclear fuel as a burnable poison, having a plurality of isotopes in an isotopic composition such that the content of at least one even mass numbered isotope is smaller than the content of the same isotope in natural gadolinium. A fuel assembly is also provided having a plurality of nuclear fuel rods arrayed as a lattice in which at least one of the fuel rods contains the gadolinium burnable poison of the present invention. Also, a fuel assembly is described which has a plurality of nuclear fuel rods arrayed as a lattice which includes at least a first group and a second group of nuclear fuel rods containing gadolinium. The content of Gd-157 in the gadolinium is larger than that found in natural gadolinium. Further, the gadolinium concentrations in the first and second groups are different from each other.

7 Claims, 7 Drawing Sheets

NUCLEAR FUEL CONTAINING GADOLINIUM

BACKGROUND OF THE INVENTION

1. Field of The Invention

The present invention relates to nuclear fuel containing gadolinium wherein elemental gadolinium is introduced as a burnable poison. In particular, the present invention relates to nuclear fuel having increased fuel burnup efficiency, effected by increasing reactivity while minimizing any adverse effect on the shutdown margin and thermal margin.

2. Description of the Related Art

Natural gadolinium contains seven different isotopes. The isotopic composition and thermal neutron absorption cross-section of elemented gadolinium is shown in Table 1. In natural gadolinium, Gd-155 and Gd-157 have the largest cross-section and act as neutron absorbers, performing the function of reactivity control. Aside from the isotopes listed in Table 1, natural gadolinium also contains about 0.2% of Gd-152, but its effect on fuel reactivity is small.

TABLE 1

| Isotope | Natural abundance (%) | Thermal neutron absorption cross-section (barn) $10^{-24}$ cm$^2$ |
|---|---|---|
| Gd-154 | 2 | 60 |
| Gd-155 | 15 | 61000 |
| Gd-156 | 20 | 2 |
| Gd-157 | 16 | 255000 |
| Gd-158 | 25 | 2 |
| Gd-160 | 22 | 1 |

Figure 1:
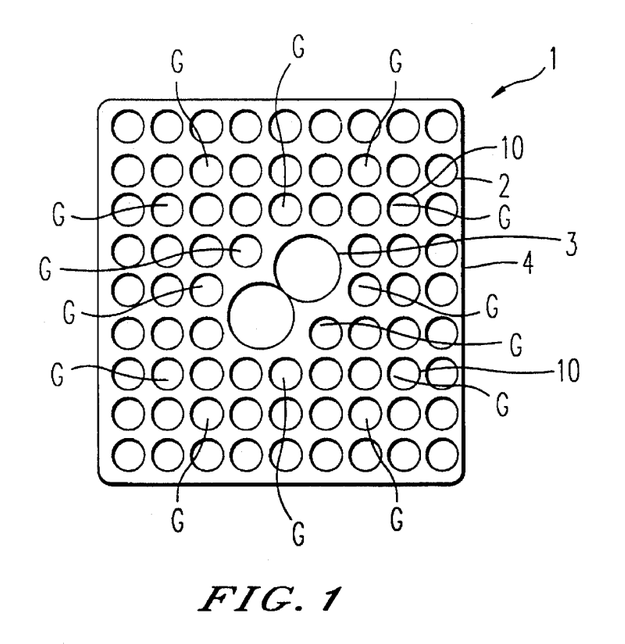
FIG. 1 is a transverse cross-sectional view of a fuel assembly used in a boiling water reactor.

FIG. 1 shows a transverse cross-sectional view of a conventional fuel assembly loaded in a boiling-water nuclear reactor. Fuel assembly (1) consists of a fuel rod bundle having 74 fuel rods (2) and two water rods (3) in the form of a lattice, this fuel rod bundle being surrounded by a channel box (4).

Figure 2:
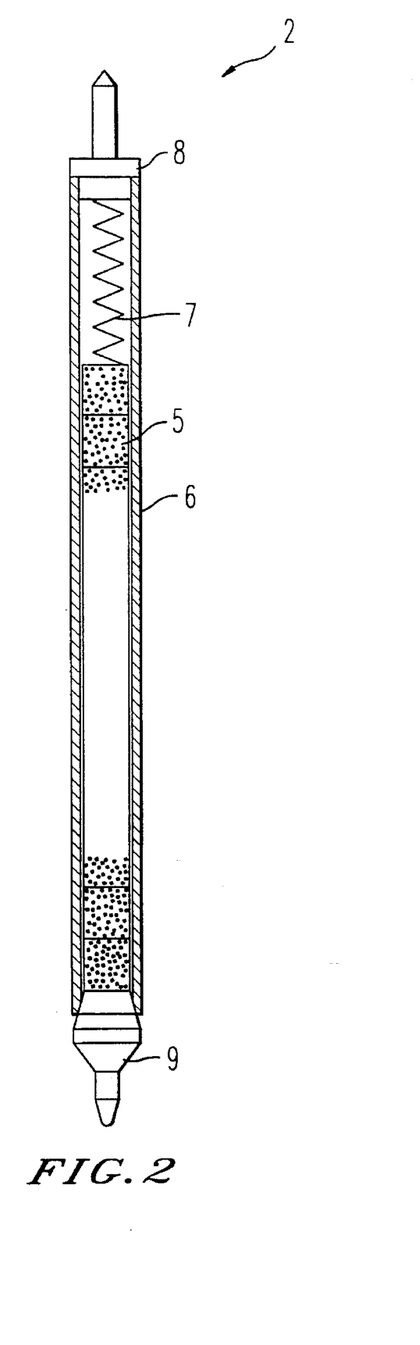
FIG. 2 is an axial cross-sectional view of a fuel rod used in the fuel assembly shown in FIG. 1.

FIG. 2 is an axial cross-sectional view of a conventional fuel rod (2). The fuel rod (2) is rod-shaped having a diameter of about 1 cm, a total length of about 4 m, and is constituted by fuel pellets (5) consisting of sintered uranium(or plutonium) oxide packed in a cladding tube (6) made of zirconium alloy, fixed by a spring (7) and hermetically sealed by a top end plug (8) and a bottom end plug (9). The mean uranium enrichment of fuel assembly (1) in this example is 4.0%.

In fuel rods (10) indicated by the symbol G in FIG. 1, gadolinia (gadolinium oxide) is admixed with the uranium oxide as a burnable poison in order to control the initial excess reactivity of the reactor. In this example, gadolinia is contained in 14 of the 74 fuel rods.

Figure 3:
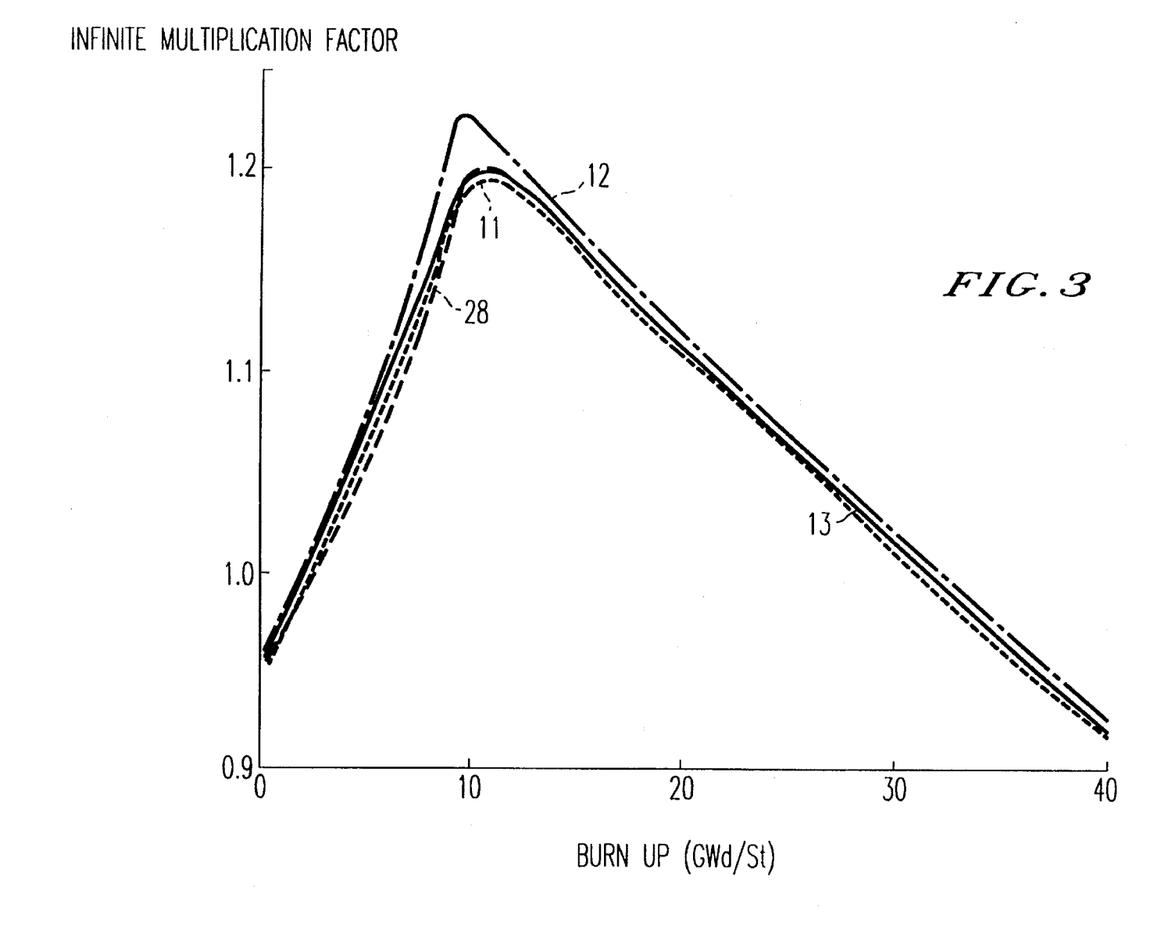
FIG. 3 is a graph showing the burnup variation of the infinite multiplication factors of a fuel assembly according to a prior art example and of a fuel assembly according to an embodiment of this invention.

FIG. 3 shows the infinite multiplication factor (11) of the fuel assembly of FIG. 1. The number of fuel rods (10) containing gadolinium is determined such that the initial excess reactivity of the reactor is within a suitable range and the gadolinia concentration is determined such that the gadolinia is consumed in the final period of the operating cycle, so as not to cause loss of reactivity. In this example, the operating period is assumed to be 13 months and the gadolinia concentration is 4.0%.

Figure 4:
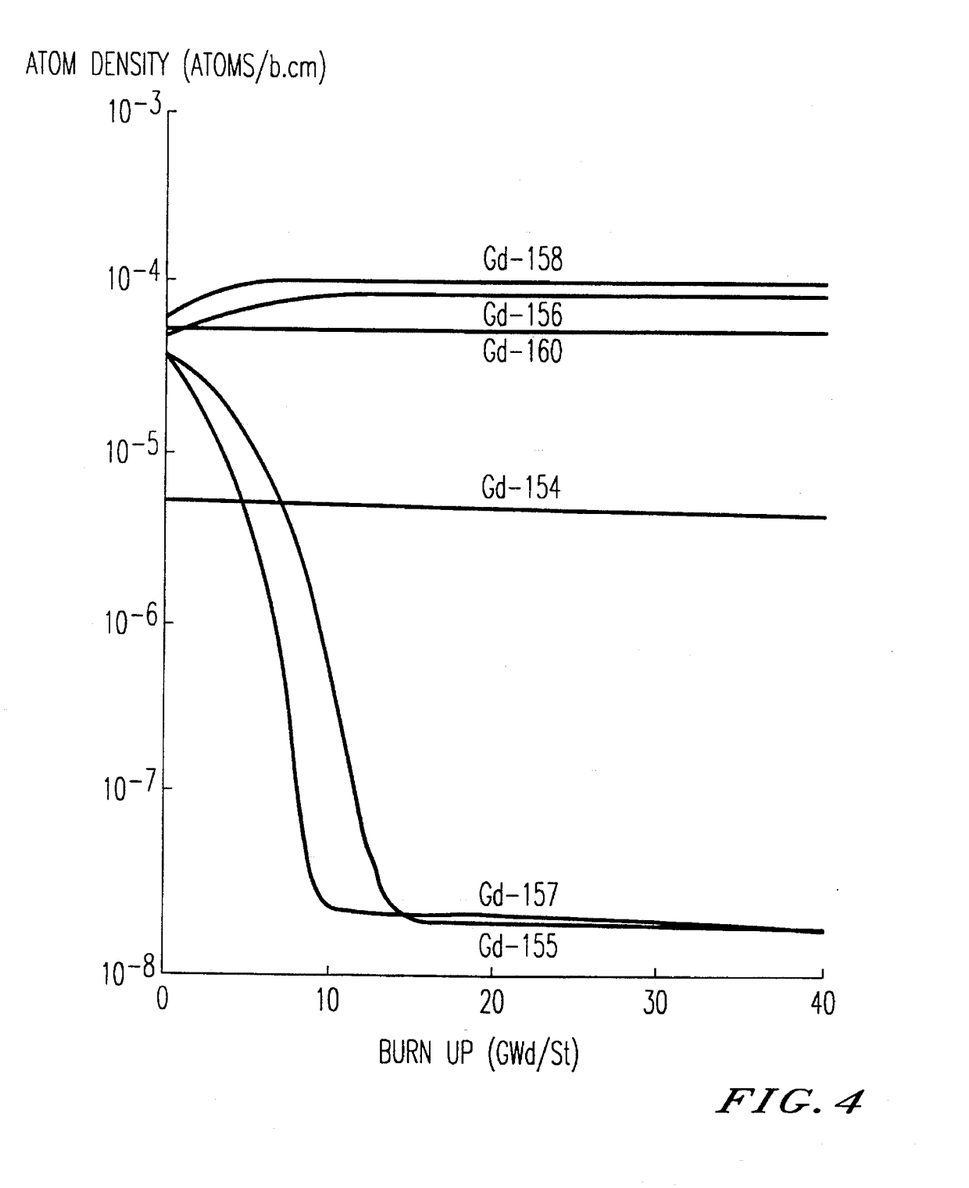
FIG. 4 is a graph showing the burnup variation of atom density of gadolinium isotopes in a fuel assembly using natural gadolinium.

FIG. 4 shows the density of the number of atoms of the isotopes of gadolinium. As burnup proceeds, there is a rapid decrease in the amounts of Gd-155 and Gd-157, which have a large cross-section, and a slow decrease in Gd-154 and Gd-160, which have a small cross-section. Gd-156 and Gd-158 also have a small cross-section but since these are produced by neutron absorption of Gd-155 and Gd-157 respectively, they increase as burnup proceeds until the Gd-155 and Gd-157 have been converted, after which they change over to a slow decrease. Normally, the point at which the isotopes of large cross-section, namely Gd-155 and Gd-157, have decreased to practically constant values is referred to as gadolinia burnout.

Figure 5:
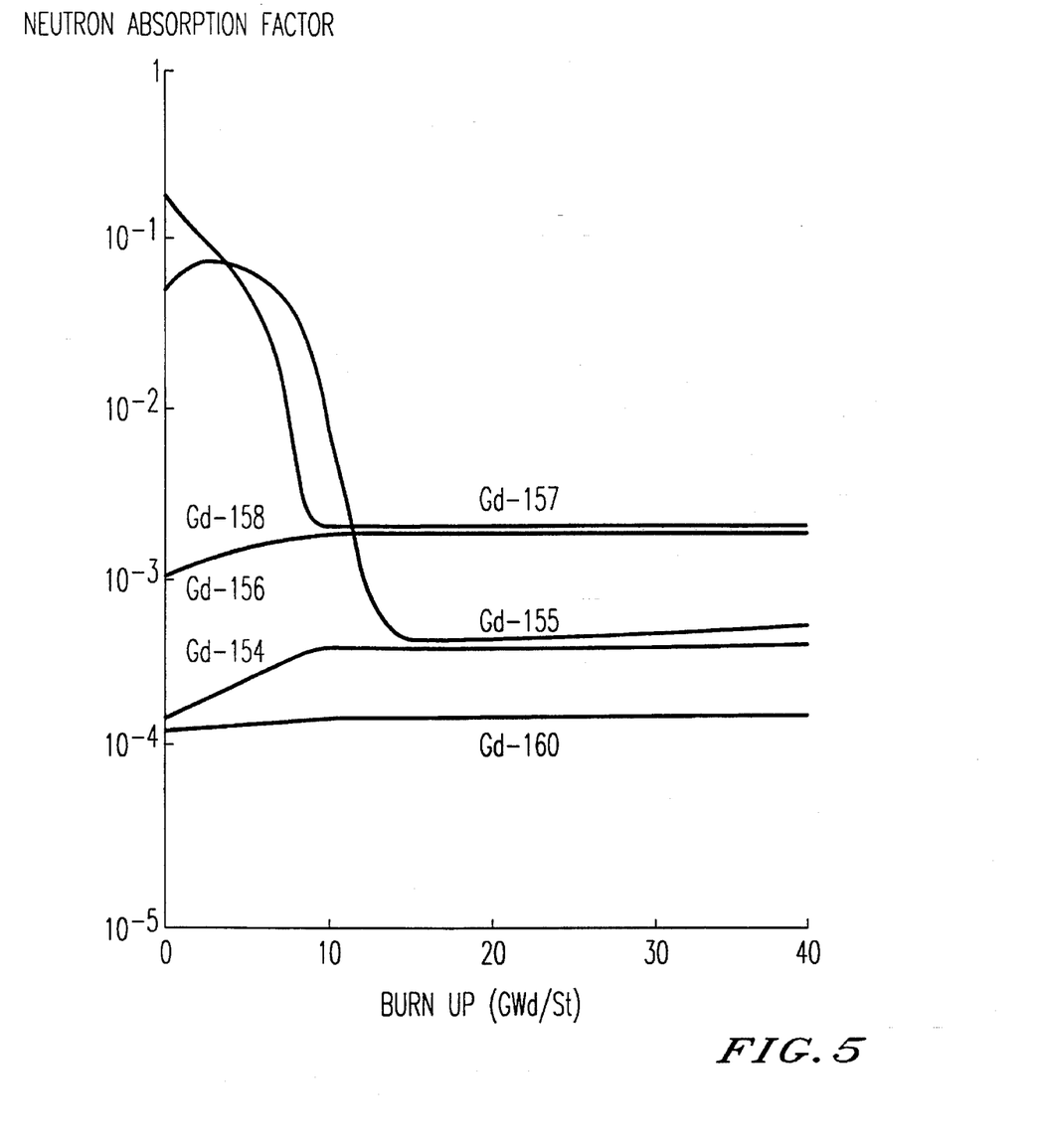
FIG. 5 is a graph showing the burnup variation of neutron absorption factor of gadolinium isotopes in a fuel assembly using natural gadolinium.

FIG. 5 shows the neutron absorption factor of gadolinium isotopes. The change with burnup is roughly proportional to the atom density and its magnitude depends on the product of atom density and cross-section. Consequently, after gadolinia burnout, although Gd-156 and Gd-158 are present in higher atom density than the Gd-155 and Gd-157, since their cross-sections are smaller they provide neutron absorption of about the same order. The temporary increase in neutron absorption of Gd-155 in the initial period of burnup is caused by change in the neutron flux. Specifically, while a lot of Gd-157, which has a large cross-section, is still present, the neutron flux is decreased by the neutron absorption of this Gd-157. When the amount of Gd-157 is reduced as burnup proceeds, the neutron flux is thereby increased.

As already mentioned, the density of the gadolinia is determined such as not to produce a loss in reactivity when it is burned out at the latter part of the operating cycle. In this connection, the gadolinium isotopes that get burned up are Gd-155 and Gd-157, which have large cross-section; while the content of the other isotopes slightly decreases or increases. Consequently, even when all the Gd-155 and Gd-157 has been burned out, the gadolinium as a whole still retains neutron absorbance which produces a loss in reactivity.

In Table 2, the neutron absorption rate of each Gd isotope is given in 25 GWd/st, as a typical level of burnup after gadolinia burnout. The Tb-159 is produced by immediate beta decay of the Gd-159 generated by neutron absorption by Gd-158; its thermal neutron absorption cross-section is 23 barn. The total thermal neutron absorption factor due to these is 0.81%. This results in loss of reactivity, thus lowering the burnup efficiency of the fuel.

TABLE 2

| Isotope | Neutron absorption factor (%) |
|---|---|
| Gd-154 | 0.04 |
| Gd-155 | 0.05 |
| Gd-156 | 0.21 |
| Gd-157 | 0.23 |
| Gd-158 | 0.21 |
| Tb-159 | 0.05 |
| Gd-160 | 0.02 |
| Total | 0.81 |

If gadolinium is admixed with the uranium oxide as a burnable poison, the thermal conductivity is lowered, tending to produce higher fuel temperatures. Since the lowering in thermal conductivity is proportional to the gadolinium concentration, very high gadolinium concentrations are not desirable. There is also some concern that the fact that gadolinia-containing fuel rods have lower uranium concentrations than fuel rods not containing gadolinia may cause a drop in thermal output, avoiding excessive rise in fuel temperature.

A technique for increasing fuel burnup efficiency by reducing loss of reactivity is disclosed in Early Japanese Patent Publication Number Sho. 58-140673; wherein reactivity loss is decreased by raising the Gd-157 content. As an example of the application of this technique, Table 3 shows the reactivity loss at 25 GWd/st in the fuel assembly of FIG. 1 when gadolinium consisting solely of Gd-157 is used. Adjustment is made such that the total content of Gd-155 and Gd-157, which have large cross-sections, is the same as natural gadolinium, the gadolinia concentration being 1.2%. The fact that only a small degree of neutron absorption is produced by the Gd-158 generated by neutron absorption of the Gd-157 greatly reduces the overall loss of reactivity.

TABLE 3

| Isotope | Neutron absorption factor (%) |
| --- | --- |
| Gd-154 | 0.0 |
| Gd-155 | 0.0 |
| Gd-156 | 0.0 |
| Gd-157 | 0.02 |
| Gd-158 | 0.16 |
| Tb-159 | 0.03 |
| Gd-160 | 0.0 |
| Total | 0.21 |

The above technique made it possible to reduce the gadolinia concentration from 40%, when natural gadolinia is used, to 1.2%. Since thermal conductivity does not depend on the type of isotope, this means that the drop in thermal conductivity due to gadolinia inclusion is greatly mitigated. If this method is employed, the uranium enrichment of the fuel rods with gadolinia admixture can be raised above that used previously. This not only improves fuel economy by making it possible to raise the burnup rate but also reduces local power peaking in the fuel assembly cross-sectional plane. Alternatively, if it is assumed that a thermal conductivity of the same order as that obtained when natural gadolinium is employed is satisfactory, the concentration of the Gd-157, which is the isotope which essentially performs the burnable poison function, can be raised, thereby making it possible to lengthen the period of reactivity control by gadolinia by a factor of 3 or more. This makes possible long-term operation, so the availability factor of the reactor can be raised.

However, when applying the above technique to a fuel assembly, the following problems occur.

First, the reactor shutdown margin is adversely affected. On shutdown, the reactor is in a subcritical condition due to all the control rods being inserted into the core. However, the core is required to remain in subcritical condition, even if any one control rod is withdrawn from the core. This degree of subcriticality is the reactor shutdown margin.

FIG. 3 shows a comparison of the infinite multiplication factor (12) of a fuel assembly using gadolinium consisting of Gd-157 with the infinite multiplication factor (11) of a fuel assembly using natural gadolinium. When natural gadolinium, is employed, containing Gd-155 and Gd-157, which are of large cross-section, the infinite multiplication factor shows a comparatively gradual approach to its peak due to the different burnup rates of the two isotopes.

In contrast, in the case where only Gd-157 is present, a large sharp peak value is displayed. The shutdown margin becomes tight as the infinite multiplication factor approaches its peak, so if gadolinium of high Gd-157 content is employed, there is an adverse effect on the shutdown margin, i.e. the shutdown margin becomes too small.

The second problem is an increase in channel peaking. Channel peaking expresses the maximum value of the fuel assembly thermal output divided by the mean value of the fuel assembly thermal output. Fuel assemblies of different burnup are installed in the core of a reactor, and the fuel assembly thermal output depends on the infinite multiplication factor. Consequently, if the peak value of the infinite multiplication factor in fuel assemblies, using gadolinium of high Gd-157 content, gets too large, channel peaking also increases. As a result, the thermal margin of the minimum critical power ratio and/or the maximum linear heat generation rate, etc., is adversely affected.

Figure 6:
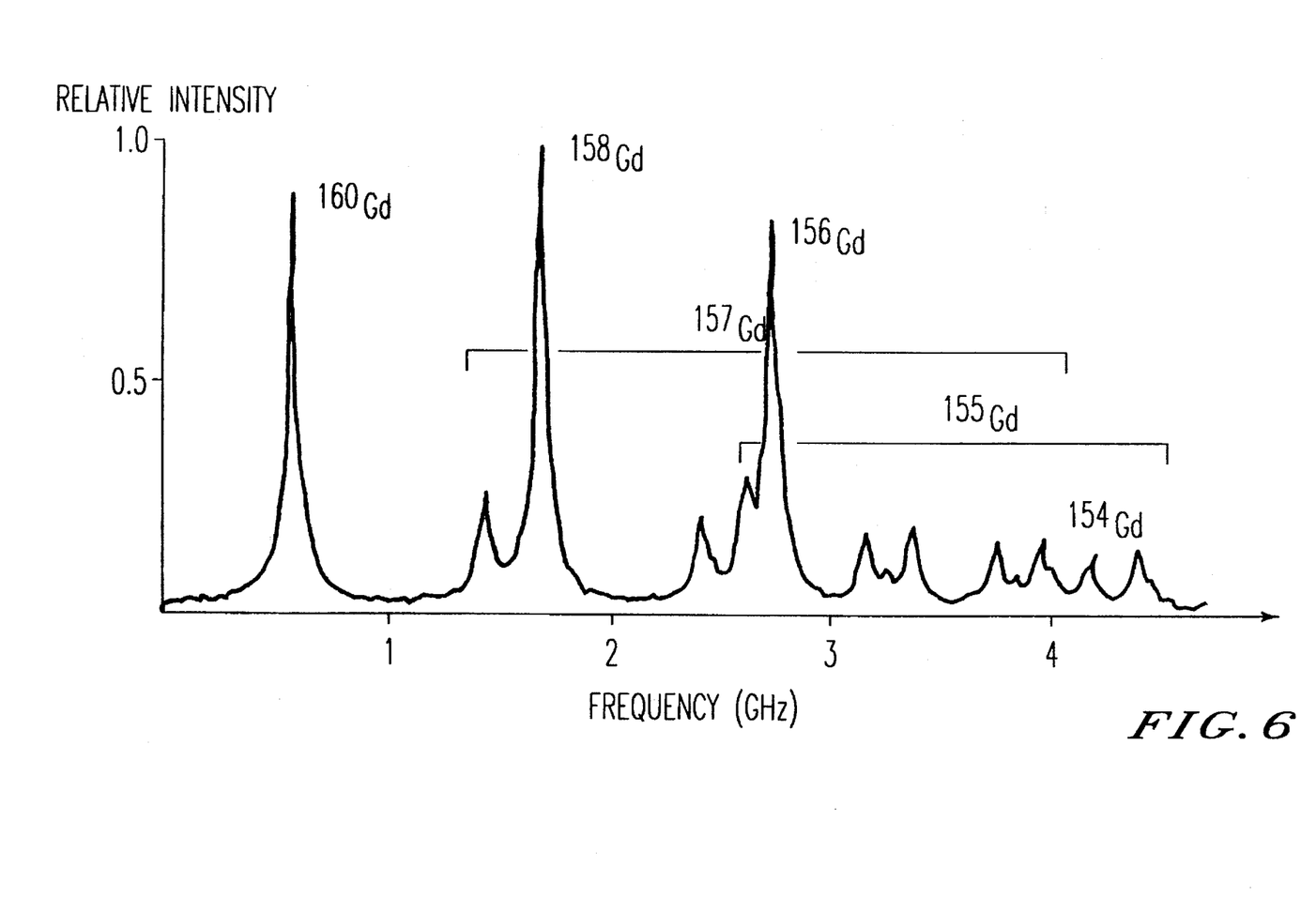
FIG. 6 is an example of an optical absorption spectrum of gadolinium isotopes.

The third problem is as follows: Since gadolinium has a large number of isotopes, the most effective method of isotope separation to increase the Gd-157 content is the laser method. In the laser method, natural gadolinium is irradiated with laser light having a specific wavelength to ionize only a specific isotope, which is recovered, thereby raising the content of that isotope. However, in the case of an isotope such as Gd-157, which is of odd mass number, some electron energy levels are split into several levels by interaction with the atomic nucleus. FIG. 6 shows an example of an optical absorption spectrum. When such an isotope is ionized, if a single laser beam is employed matching the wavelength of only one of these split energy levels, the ionization efficiency is decreased. In order to perform ionization efficiently, the number of laser beams may be increased corresponding to the number of split energy levels, but this complicates the laser device and raises its cost.

SUMMARY OF THE INVENTION

Accordingly, one object of the present invention is to provide nuclear fuel in which the fuel burnup efficiency can be raised by increasing reactivity without adversely affecting the reactor shutdown margin and thermal margin.

A further object of the present invention is to provide gadolinium as a burnable poison for nuclear fuel, in which the content of an even mass numbered isotope of gadolinium is lower than the content of the same isotope in natural gadolinium.

Another object of the present invention is to provide a fuel assembly containing fuel rods having gadolinium present as a burnable poison in which the content of an even mass numbered isotope of the gadolinium is lower than the content of the same isotope in natural gadolinium.

Another object of the present invention is to provide a fuel assembly having the above characteristics, in which the gadolinium content in the upper portion of the fuel assembly is different from the gadolinium content in the lower portion of the fuel assembly.

Another object of the present invention is to provide a fuel assembly having a plurality of fuel rods in at least two defined groups wherein the Gd-157 content of at least two groups is larger than the Gd-157 content in natural gadolinium and where the gadolinium concentration of a first group of fuel rods is different from the gadolinium concentration of a second group of fuel rods.

These and other objects of the present invention have been satisfied by the discovery of gadolinium for use as a burnable poison for nuclear fuel, comprising a plurality of isotopes of gadolinium, wherein a content of at least one even mass numbered isotope of the plurality of isotopes is smaller than a content of the at least one even mass numbered isotope in natural gadolinium, and its use in a fuel assembly comprising a plurality of nuclear fuel rods arrayed in a lattice, wherein at least one of the fuel rods includes gadolinium having a plurality of isotopes, wherein a content of at least one even mass numbered isotope of said plurality of isotopes is smaller than a content of said at least one even mass numbered isotope in natural gadolinium.

There has also been provided, in accordance with yet another aspect of the present invention, a fuel assembly comprising a plurality of nuclear fuel rods arrayed in a lattice. The plurality of fuel rods include at least first and second groups of fuel rods, each including gadolinium having a Gd-157 content which is larger than the Gd-157 content in natural gadolinium. The gadolinium concentrations in the first and second groups are different from each other.

Other objects, features, and advantages of the present invention will became apparent from the following detailed description. It should be understood, however, that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

In the accompanying drawings:

FIG. 9 is a gadolinium concentration distribution diagram of a prior art fuel assembly given for comparison with an embodiment of the present invention. (A) is a transverse cross-sectional diagram of a fuel assembly. (B) is a diagram showing the gadolinia concentration distribution of the gadolinia-containing fuel rods.

DETAILED DESCRIPTION OF THE PREFERRED EMBODIMENTS

The present invention relates to gadolinium for use as a burnable poison for nuclear fuel, comprising:

a plurality of isotopes of gadolinium, wherein a content of at least one even mass numbered isotope of said plurality of isotopes is smaller than a content of said at least one even mass numbered isotope in natural gadolinium, and a fuel assembly comprising a plurality of fuel rods comprising the gadolinium.

As seen in Table 2, when natural gadolinium is used, Gd-156, Gd-157 and Gd-158 contribute to about the same degree to the loss of reactivity after burnout of the gadolinium. In the case of Gd-156, that produced from Gd-158, neutron absorption and that which is found naturally are present in a ratio of about 15:20. In the case of Gd-158, that produced from Gd-157 by neutron absorption and that which is found naturally are present in a ratio of about 16:25. Therefore, by making the content of Gd-156 and Gd-158 low, the loss of reactivity due to these isotopes can be greatly reduced.

Lowering the Gd-156 moreover enables the reactivity loss due to Gd-157 to be reduced. The change with time of the atom density of Gd-157 after the naturally present Gd-157 has all been converted into Gd-158 is expressed by the following equation.

$$dN7/dt = -N7\sigma7\ \phi + N6\sigma6\ \phi$$

where N6 and N7 are the atom densities of Gd-156 and Gd-157, respectively $\sigma6$ and $\sigma7$ are their respective cross-sections, and $\phi$ is the neutron flux. Since $\sigma6$ is very much smaller than $\sigma7$, with the lapse of sufficient time $dN7/dt = 0$. At this point, $N6\ \sigma6\ \phi = N7\sigma7\ \phi$, and an equilibrium condition is produced in which the neutron absorption factors of Gd-156 and Gd-157 are equal and the atom density of Gd-157 is proportional to the atom density of Gd-156.

As shown in FIG. 4, the atom density of Gd-156 after the Gd-155 has been fully converted to Gd-156 is practically constant and is determined by the quantities of Gd-155 and Gd-156 that were present initially. The loss in reactivity due to Gd-157 can therefore also be reduced by lowering the Gd-156 content.

Also, by maintaining the contents of Gd-155 and Gd-157, which function in essential part as burnable poisons, reactivity control can be achieved for the necessary initial period, so isotopes other than these can be removed and the gadolinia concentration can therefore be lowered by a corresponding amount. As a result, the thermal conductivity of the fuel is raised so the benefits of higher burnup and/or reduction in local power peaking can be obtained and gadolinia concentration can be raised, thereby making it possible to raise the availability factor by long-term operation.

Furthermore, since the Gd-155 and Gd-157 are present in the same ratio as in natural gadolinium, the peak value of the infinite multiplication factor will not get too large. It is therefore possible to solve the problems of adverse effect on shutdown margin and increase in channel peaking.

In a fuel assembly according to the present invention, Gd-157-enriched gadolinium, having Gd-157 content higher than natural abundance, is employed as a burnable poison, and fuel rods are allocated into a plurality of groups of mutually different burnable poison concentrations. The atom density variation of Gd-157 and Gd-155 shown in FIG. 4 can therefore be obtained by simulation. This makes it possible to reduce the peak value of the infinite multiplication factor, so the problems of adverse effect on the shutdown margin and increased channel peaking can be overcome.

In one embodiment of the present invention, gadolinium containing no Gd-156 at all (shown in Table 4) is employed as a burnable poison in a fuel assembly as shown in FIG. 1.

The gadolinium is included in the fuel in the form of gadolinia at a gadolinia concentration of 3.2%. The total mass content of Gd-155 and Gd-157 is the same as when natural gadolinium is used with a gadolinia concentration 4.0%. The neutron absorption factor at 25 GWd/st in this embodiment is 0.60%, providing a reactivity gain of 0.21% when compared with the gain of 0.81% which is obtained when natural gadolinium is used, as shown in Table 2. Consequently, compared with a prior art example using natural gadolinium, burnup can be prolonged by about 1% for the same uranium concentration. Alternatively, the uranium concentration to achieve the same burnup as in the prior art example can be lowered by about 0.03%.

FIG. 3 shows the burnup variation (13) of the infinite multiplication factor in this embodiment. It can be seen from the Figure that a burnup variation is displayed which is very similar to that of the infinite multiplication factor (11) in the prior art example in which natural gadolinium is employed. Since the peak of the infinite multiplication factor does not get too large, there is no risk of adverse effects on shutdown margin and channel peaking.

Figure 7:
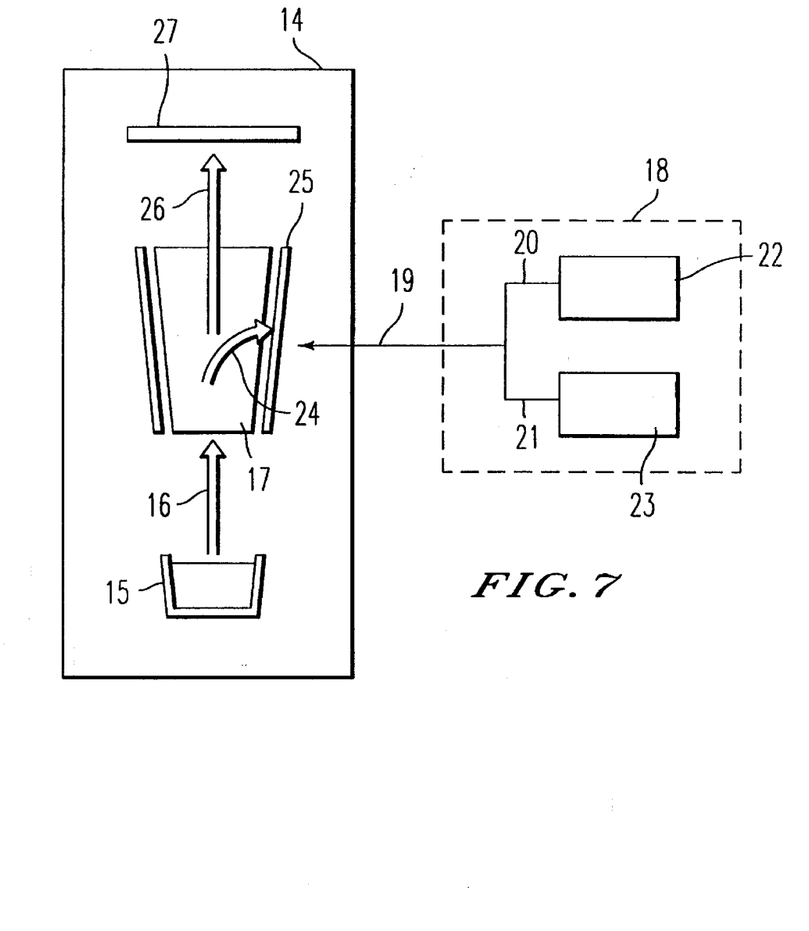
FIG. 7 is an example of a laser device for manufacturing elemental gadolinium having lower Gd-156 content than the natural abundance.

FIG. 7 is a schematic diagram showing an example of a laser device for manufacturing the gadolinium shown in Table 4. First of all, gadolinium metal is melted and evaporated by a metal vapor generating device (15) in the interior of a separation cell (14) maintained at high vacuum. The neutral vapor current (16) that is thus generated is fed into an optical reaction unit (17) where only the Gd-156 is ionized by irradiating the vapor with laser light (19) introduced from a laser system (18). Preferably, rather than carrying out the ionization directly from the ground state, a selective excitation laser beam (20) is used to temporarily selectively excite the Gd-156 to a specific excited condition. The excited Gd-156 is then ionized by irradiating with a further ionizing laser beam (21). Laser devices (22) and (23) are constituted by a pumping laser, variable-wavelength laser, frequency modulating device and pulse laser amplifier. The ionized Gd-156 vapor current (24) which is obtained in this way is adsorbed onto an ion recovery electrode plate (25). Vapor current (26) consisting of the other gadolinium isotopes which have not been ionized is recovered onto a neutral atom recovery plate (27). Gadolinium of lower Gd-156 content than the natural abundance can therefore be obtained by recovering the gadolinium from neutral recovery plate (27).

TABLE 4

| Isotope | Content (%) | Neutron absorption factor (%) |
| --- | --- | --- |
| Gd-154 | 3 | 0.04 |
| Gd-155 | 19 | 0.05 |
| Gd-156 | 0 | 0.11 |
| Gd-157 | 20 | 0.12 |
| Gd-158 | 31 | 0.21 |
| Tb-159 | 0 | 0.05 |
| Gd-160 | 27 | 0.02 |
| Total | 100 | 0.60 |

As a further embodiment, gadolinium containing no Gd-156 or Gd-158 at all, as shown in Table 5, is employed as a burnable poison in a fuel assembly as depicted in FIG. 1. The gadolinia concentration is 2.2%, and the total mass content of Gd-155 and Gd-157 is the same as when natural gadolinium is used with gadolinia concentration of 4.0%. The neutron absorption factor at a burn up of 25 GWd/st in this embodiment is further reduced from that in the first embodiment at 0.45%. In other words, a reactivity gain of 0.36% is obtained compared with the gain of 0.81% which is obtained when natural gadolinium is used, as shown in Table 1. Consequently, compared with a prior art example using natural gadolinium, burnup can be prolonged by about 2 for the same uranium concentration. Alternatively, the uranium concentration to achieve the same burnup as in the prior art example can be lowered by about 0.04%. In this embodiment also, since the peak of the infinite multiplication factor does not get too large, there is no risk of adverse effects on shutdown margin and channel peaking.

TABLE 5

| Isotope | Content (%) | Neutron absorption factor (%) |
| --- | --- | --- |
| Gd-154 | 4 | 0.04 |
| Gd-155 | 27 | 0.05 |
| Gd-156 | 0 | 0.11 |
| Gd-157 | 29 | 0.12 |
| Gd-158 | 0 | 0.09 |
| Tb-159 | 0 | 0.02 |
| Gd-160 | 40 | 0.02 |
| Total | 100 | 0.45 |

Comparing the above described embodiments, it can be seen that the reduction in reactivity loss produced by removing the Gd-158 is 0.15%. In order to reduce reactivity loss, it is therefore of initial importance to remove the Gd-156 and it is next important to remove the Gd-158. The other isotopes of even mass number present in gadolinium are Gd-152, Gd-154 and Gd-160. Since the content of Gd-152 and Gd-154 is in any case small, little reactivity loss improvement results from their removal. Next, Gd-154 has a neutron absorption factor due to Gd-154 itself of 0.04%. However, it acts as a source of Gd-155, which has a neutron absorption factor of 0.05%. Consequently by removing the Gd-154 a reactivity gain of 0.09% is obtained. Removing Gd-154 can therefore come third in order of reference. In contrast, Gd-160 has a large natural abundance of 22%, but, as shown in Table 1, its cross-section is small, so its removal gives little benefit in terms of lowering reactivity loss. However, since there is a large Gd-160 content, removing it is beneficial in raising thermal conductivity, and so is effective in achieving high burnup and/or prolonging reactor operation.

Figure 8:
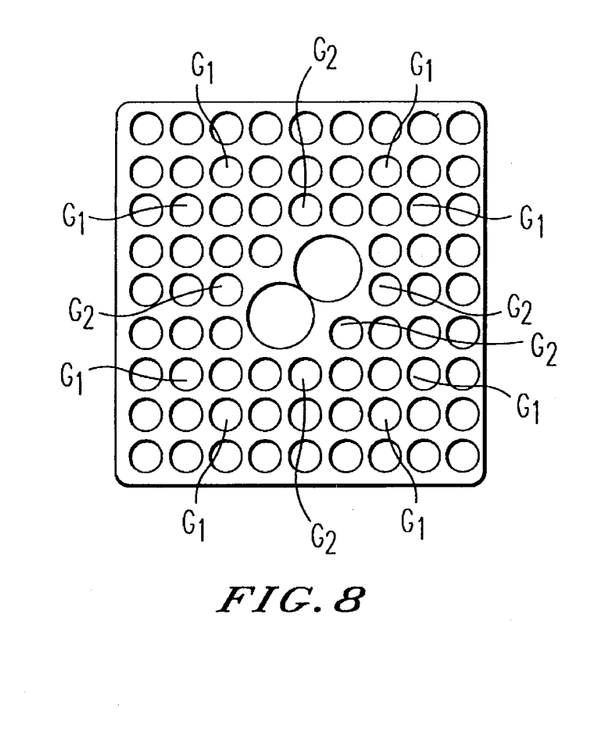
FIG. 8 is a transverse cross-sectional view of a fuel assembly according to one embodiment of the present invention.

FIG. 8 shows a transverse cross-sectional view of a fuel assembly constituting another embodiment of the present invention. This embodiment is an example in which the Gd-157 content is made higher than the natural abundance. In fact, gadolinium consisting solely of Gd-157 is employed as burnable poison. The gadolinia concentration is 1.2% in the case of eight fuel rods G1 and 1.5% in the case of five fuel rods G2. Specifically, the burnup variation of Gd-157 shown in FIG. 4 is simulated by the gadolinia of G1 and the burnup variation of Gd-155, which has a slower burnup rate, is simulated by the gadolinia of G2. Furthermore, since the gadolinia content is substantially greater in G2, the number of gadolinia-containing fuel rods can be reduced by 1 to 13 rods. The uranium concentration in this embodiment is 0.1% lower than 4.0%, i. e., 3.9%.

FIG. 3 shows the burnup variation (28) of the infinite multiplication factor of this embodiment. In this embodiment, the infinite multiplication factor (11) of conventional fuel using natural gadolinium is closely simulated. In particular, the peak value of the infinite multiplication factor can be made smaller. The reactivity loss due to the gadolinia can thereby be reduced and the same burnup as in the conventional example can be achieved with a lower uranium concentration, without adverse effect on the shutdown margin or channel peaking.

It is desirable to set the ratio of gadolinia concentration of the rods G1 to the rods G2 at about 1.2 to 1.3 as in this embodiment. In this way, the burnup variation in atom number density of Gd-155 and Gd-157 shown in FIG. 4 can be roughly simulated. Although, in this embodiment, two levels of gadolinia concentration were employed, three or more levels of gadolinia concentration could be used.

In a fuel assembly according to an additional embodiment of the present invention, the transverse cross-sectional plane is the same as in the prior art example of FIG. 1, but the gadolinia in gadolinia-containing fuel rods (10) is different in the vertical axial direction. Specifically, gadolinium consisting solely of Gd-157 is employed in the bottom while in the top portion natural gadolinium is employed. The gadolinium concentrations are 1.2% in the bottom and 4.0% in the top portion.

The neutron importance on reactor shutdown is a maximum at a location ¼ to ⅓ of the total length below the top of the core. The infinite multiplication factor at the bottom of the core has scarcely any effect on the effective multiplication factor of the core at shutdown. With this embodiment, gadolinium of high Gd-157 content is only used in the bottom of the fuel assembly, so the possibility of excessive peaking of the infinite multiplication factor is confined to the bottom of the fuel assembly. Reactivity loss in the bottom of the fuel assembly can therefore be decreased with no risk of adverse effect on the shutdown margin.

In general in a boiling water nuclear reactor, power peaking in the axial direction is liable to occur in the bottom of the core. Consequently, in this embodiment, if the uranium concentrations are the same in the top and bottom portions of the fuel assembly, the infinite multiplication factor is largest in the bottom, where the reactivity loss produced by the gadolinia is smallest. As a result, there is a possibility of increased axial power peaking in the bottom of the core. In such a case, means may be adopted such as making the uranium concentration at the bottom of the fuel assembly lower than at the top, using more gadolinia-containing fuel rods in the bottom than in the top, or making the gadolinia concentration at the bottom of the fuel assembly richer than in this embodiment.

Figure 9A:
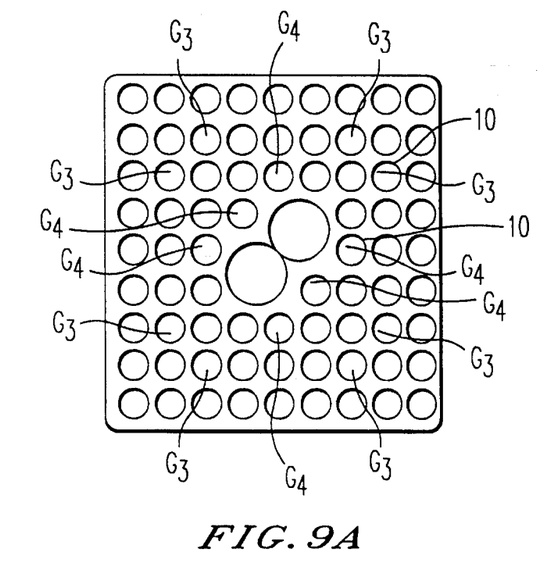
Figure 9B:
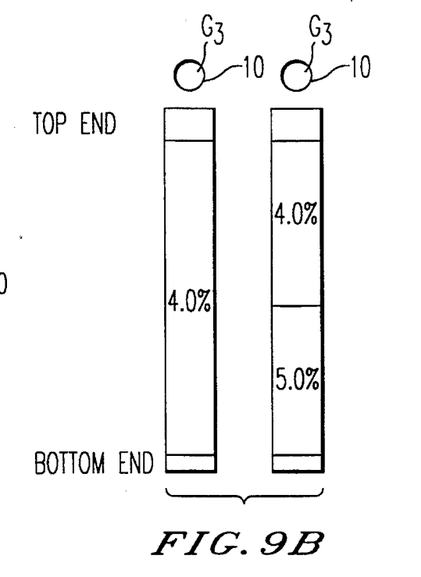

Early Japanese Patent Publication Sho. 54-13899 discloses a technique of making the gadolinia concentration used in the bottom of the fuel assembly richer than at the top, in order to reduce axial power peaking occurring at the bottom of the core in a boiling water reactor. In a fuel assembly making use of this technique shown in FIGS. 9(A) and (B), in all the fuel rods, natural uranium is employed in portions at the top and bottom ends while enriched uranium is employed in the middle portion. The gadolinia-containing fuel rods (10) are of two kinds: in fuel rods G3, the gadolinia concentration is 4.0% at both top and bottom; in fuel rods G4, it is 4.0% at the top and 5.0% at the bottom. In this example, since the gadolinia concentration is higher at the bottom of fuel rods G4, the thermal conductivity here is lower, so the degree of uranium enrichment of the entire middle portion of fuel rods G4 is lower than the degree of uranium enrichment of the middle portion of fuel rods G3. As a result, local power peaking in the cross-sectional plane of the fuel assembly is adversely affected.

In a further embodiment of the present invention, the gadolinium which does not contain Gd-156, as indicated in Table 4, is used in the bottom of fuel rods G4, and natural gadolinia is used for the top. The gadolinia concentration is 4.0% at both the top and the bottom. With such a gadolinia distribution, the same reactivity control as in the prior art example can be achieved. In this embodiment, the uranium concentration of fuel rods G3 and fuel rods G4 is the same. As a result, lower power peaking in the cross-sectional plane of the fuel assembly is improved in comparison with the prior art example. Of course, gadolinium which does not contain Gd-156 could be used in both the top and bottom of G3 and G4, but this is more expensive to manufacture than natural gadolinium, so in order to keep costs down, it may be used, as in this embodiment, only in the bottom portion of the fuel assembly. Obviously, instead of using gadolinium which does not contain Gd-156, the same effect can be obtained by using gadolinium in which the Gd-157 content is raised above its natural abundance.

The initially loaded fuel loaded in the first cycle of reactor operation has a gadolinia concentration higher than that of the replacement fuel loaded in the second and subsequent cycles. Gadolinia of concentration 7 to 8% is used in this initially loaded fuel. This is because the operating period of the first cycle for the start-up test is longer than the operating period of the second and subsequent cycles. If the initially loaded fuel is made of high enrichment in order to raise fuel economy, the number of rods to be replaced on first replacement is reduced so the excess reactivity of the second cycle must be borne by gadolinia present in the initially loaded fuel.

Consequently, with higher enrichment of the initially loaded fuel, if one seeks to raise the gadolinia concentration, and if in the initially loaded fuel the gadolinia concentration in the bottom portion is richer than in the top portion, the gadolinia concentration will in fact be restricted by the gadolinia concentration present in the bottom portion of the fuel assembly. In such cases too, it is appropriate to use more in the bottom than in the top of the fuel assembly of either (a) gadolinium whose Gd-156 content is lowered below the natural abundance or (b) gadolinium whose Gd-157 content is raised above the natural abundance as in this embodiment.

A fuel assembly according to an additional embodiment of this invention is the same as the prior art example of FIG. 1 in the transverse cross-sectional plane but the gadolinia concentration in gadolinia-containing fuel rods (10) is different between top and bottom in the axial direction. Specifically, for the top portion, gadolinium containing no Gd-156 and no Gd-158 at all, as shown in Table 5 and used in an earlier embodiment, is employed, while natural gadolinium is employed for the bottom portion. The gadolinium concentration is 2.2% in the top portion and 4.0% in the bottom portion.

The infinite multiplication factor of the fuel assembly according to this embodiment is greater, at 0.49%, in the top than in the bottom, so the occurrence of axial power peaking in the bottom of the core in the boiling water reactor is diminished and the thermal margin is therefore raised. Obviously, instead of using gadolinium which does not contain Gd-156 and Gd-158, the same effect can be obtained by using gadolinium in which the Gd-157 content is raised above its natural abundance.

As shown in FIG. 1, in a fuel assembly employed in a boiling water reactor, normally gadolinia is used in the fuel rods other than those at the outer periphery. In contrast, Early Japanese Patent Publication Sho. 58-216989 discloses an invention in which the shutdown margin is improved and higher fuel burnup achieved by using gadolinia for the fuel rods in the outer periphery. However, owing to the more rapid elimination of gadolinium resulting from the large neutron flux in the fuel rods at the outer periphery, the gadolinia concentration has to be raised, by reducing the number of gadolinium containing fuel rods. However, this led to the problem that it was difficult to raise the gadolinia concentration sufficiently, owing to the drop in thermal conductivity which this caused.

Figure 10:
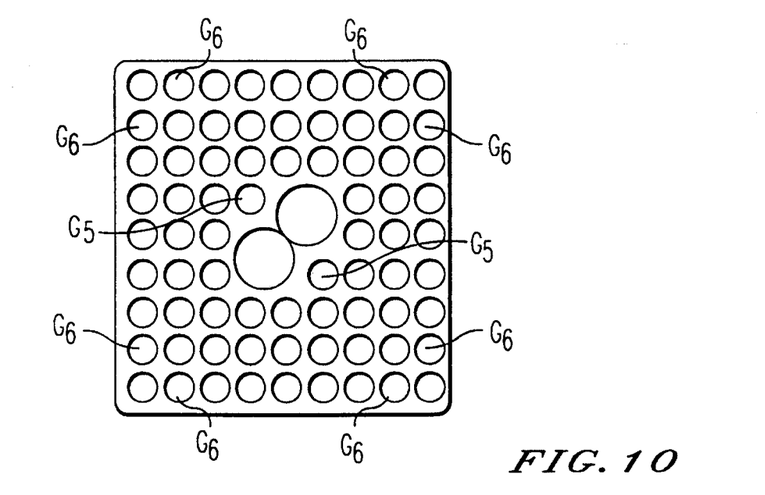
FIG. 10 is a transverse cross-sectional view of a fuel assembly according to a further embodiment of the present invention.

FIG. 10 is a transverse cross-sectional view of a fuel assembly according another embodiment of this invention. In this embodiment, apart from two fuel rods G5 in the central region, gadolinia is used in eight outer peripheral fuel rods G6. The central fuel rods G5 contain natural gadolinium in a gadolinia concentration of 4.0%; the peripheral fuel rods G6 contain gadolinium which does not contain Gd-156, Gd-158 or Gd-160, in a gadolinia concentration of 2.0%. By using such a gadolinia concentration, an infinite multiplication factor equivalent to infinite multiplication factor (11) of the prior art example shown in FIG. 1 can be achieved.

In this embodiment, if natural gadolinium is employed for the outer peripheral fuel rods G6, a gadolinium concentration of 6.0% must be used. This presents an obstacle to obtaining higher burnup since it results in lowered thermal conductivity or lower thermal output of the fuel rods due to lower uranium concentration.

In this embodiment the same effect can be obtained by using for the peripheral fuel rods G6, gadolinium in which the Gd-157 content is raised. Also for central fuel rods G5, gadolinium which does not contain Gd-156, Gd-158 or Gd-160, or gadolinium in which the content of Gd-157 is raised, can be employed. Moreover this embodiment can clearly also be applied to many of the above described embodiments. The embodiments obtained by such combinations are preferred in that their respective benefits can be achieved concurrently.

In the above embodiments the cases were described in which gadolinium from which specific gadolinium isotopes of even mass number had been completely removed, or gadolinium consisting solely of Gd-157 was employed. However, if Gd-156 removal is performed using a separation device as shown in FIG. 7, complete ionization is in fact impossible to achieve. The gadolinium recovered from neutral atom absorption plate (27) therefore still contains some Gd-156 which was not ionized. Also in the case of ionizing Gd-157, a proportion of neutral atoms which have not been ionized adheres to ion recovery electrode plate (25) so the gadolinium element recovered from ion recovery electrode plate 25 still contains some isotopes other than Gd-157. Clearly, however, the present invention can still be applied and corresponding benefits achieved even using gadolinium element of this type as actually obtained in practice.

Numerous modifications and variations of the present invention are possible in light of the above teachings. It is therefore to be understood that, within the scope of the appended claims, the present invention can be practiced in a manner other than as specifically described herein.

What is claimed as new and is desired to be secured by letters patent of the United States is:

1. Gadolinium for use as a burnable poison for nuclear fuel, comprising:

a plurality of isotopes of gadolinium, wherein a content of at least one even mass numbered isotope of said plurality of isotopes is smaller than a content of said at least one even mass numbered isotope in natural gadolinium, wherein said at least one even mass numbered isotope is both Gd-156 and Gd-158.

2. A fuel assembly, comprising:

a plurality of nuclear fuel rods arrayed in a lattice; wherein at least one of the fuel rods comprises gadolinium having a plurality of isotopes, wherein a content of at least one even mass numbered isotope of said plurality of isotopes is smaller than a content of said at least one even mass numbered isotope in natural gadolinium, wherein said at least one even mass numbered isotope is both Gd-156 and Gd-158.

3. The fuel assembly according to claim 2, wherein the content of gadolinium is higher in a lower portion of the fuel assembly than in an upper portion of the fuel assembly.

4. The fuel assembly according to claim 2, wherein the content of gadolinium is larger in an upper portion of the fuel assembly than in a lower portion of the fuel assembly.

5. The fuel assembly according to claim 2, wherein said at least one of the fuel rods comprising gadolinium is positioned at an outer peripheral portion of the fuel assembly.

6. A fuel assembly, comprising:

a plurality of nuclear fuel rods arrayed in a lattice, said plurality of fuel rods including at least first and second groups of fuel rods each comprising gadolinium isotopes wherein a content of Gd-157 is larger than a content of Gd-157 in natural gadolinium;

wherein said first group has a gadolinium concentration different from a gadolinium concentration of said second group.

7. The fuel assembly according to claim 6, wherein a ratio of said gadolinium concentration of the first group to said gadolinium concentration of the second group is from 1.2 to 1.3.

* * * * *